United States Patent
Han et al.

(10) Patent No.: US 9,554,160 B2
(45) Date of Patent: Jan. 24, 2017

(54) MULTI-ANGLE VIDEO EDITING BASED ON CLOUD VIDEO SHARING

(71) Applicant: Zepp Labs, Inc., Los Gatos, CA (US)

(72) Inventors: Zheng Han, Beijing (CN); Jie Xu, Beijing (CN)

(73) Assignee: Zepp Labs, Inc., Los Gatos, CA (US)

( * ) Notice: Subject to any disclaimer, the term of this patent is extended or adjusted under 35 U.S.C. 154(b) by 0 days.

(21) Appl. No.: 14/714,670

(22) Filed: May 18, 2015

(65) Prior Publication Data

US 2016/0345035 A1    Nov. 24, 2016

(51) Int. Cl.
| | |
|---|---|
| *H04N 21/436* | (2011.01) |
| *H04N 21/234* | (2011.01) |
| *H04N 21/2225* | (2011.01) |
| *H04N 21/4223* | (2011.01) |
| *H04N 21/218* | (2011.01) |
| *H04N 21/235* | (2011.01) |
| *H04N 21/437* | (2011.01) |

(52) U.S. Cl.
CPC .. *H04N 21/23424* (2013.01); *H04N 21/21805* (2013.01); *H04N 21/2225* (2013.01); *H04N 21/2353* (2013.01); *H04N 21/23418* (2013.01); *H04N 21/4223* (2013.01); *H04N 21/436* (2013.01); *H04N 21/437* (2013.01)

(58) Field of Classification Search
CPC combination set(s) only.
See application file for complete search history.

(56) References Cited

U.S. PATENT DOCUMENTS

| | | |
|---|---|---|
| 5,610,590 A | 3/1997 | Johnson et al. |
| 5,819,206 A | 10/1998 | Horton et al. |
| 6,224,493 B1 | 5/2001 | Lee et al. |
| 7,978,081 B2 | 7/2011 | Shears et al. |
| 8,109,816 B1 | 2/2012 | Grober |
| 8,282,487 B2 | 10/2012 | Wilson et al. |
| 8,337,335 B2 | 12/2012 | Dugan |
| 8,409,024 B2 | 4/2013 | Marty et al. |

(Continued)

FOREIGN PATENT DOCUMENTS

WO    WO 2013/093176 A1    6/2013

OTHER PUBLICATIONS

Allen, R., "Wireless Sensor Architecture Uses Bluetooth Standard" Electronic Design, Aug. 7, 2000, 5 Pages, Can be retrieved from <URL:http://electronicdesign.com/communications/wireless-sensor-architecture-uses-bluetooth-standard>.

(Continued)

*Primary Examiner* — Kieu Oanh T Bui
(74) *Attorney, Agent, or Firm* — Fenwick & West LLP

(57) ABSTRACT

A solution for composing a multi-angle video from videos captured from different angles is disclosed. A request to compose a multi-angle video is received from a target user, requesting composing a multi-angle video using a video captured by the target user and videos captured by other users nearby the target user. A plurality of videos captured by nearby users are identified based on metadata associated with the captured videos, e.g., geolocation and timestamps of the videos, and presented to the target user. A video sequence including two or more videos from the plurality of videos captured by nearby users is received and the multi-angle video is composed based on the received video sequence.

22 Claims, 13 Drawing Sheets

(56) References Cited

U.S. PATENT DOCUMENTS

| | | | |
|---|---|---|---|
| 8,409,025 | B2 | 4/2013 | Stites et al. |
| 8,449,402 | B2 | 5/2013 | Jaekel et al. |
| 8,523,696 | B2 | 9/2013 | Kamino et al. |
| 8,589,114 | B2 | 11/2013 | Papadourakis |
| 8,593,286 | B2 | 11/2013 | Razoumov et al. |
| 8,903,521 | B2 | 12/2014 | Goree et al. |
| 8,905,855 | B2 | 12/2014 | Fitzpatrick et al. |
| 8,941,723 | B2 | 1/2015 | Bentley et al. |
| 8,944,928 | B2 | 2/2015 | Kaps et al. |
| 8,956,238 | B2 | 2/2015 | Boyd et al. |
| 9,039,527 | B2 | 5/2015 | Bentley et al. |
| 2005/0032582 | A1 | 2/2005 | Mahajan et al. |
| 2005/0272516 | A1 | 12/2005 | Gobush |
| 2006/0025229 | A1 | 2/2006 | Mahajan et al. |
| 2006/0166738 | A1 | 7/2006 | Eyestone et al. |
| 2008/0085778 | A1 | 4/2008 | Dugan |
| 2009/0048044 | A1 | 2/2009 | Oleson et al. |
| 2010/0103269 | A1 | 4/2010 | Wilson et al. |
| 2010/0144414 | A1 | 6/2010 | Edis et al. |
| 2010/0323794 | A1 | 12/2010 | Su |
| 2013/0132836 | A1 | 5/2013 | Ortiz |
| 2013/0202265 | A1 | 8/2013 | Arrasvuori et al. |
| 2013/0223812 | A1 | 8/2013 | Rossi |
| 2014/0199050 | A1 | 7/2014 | Khalsa et al. |
| 2015/0181258 | A1* | 6/2015 | Kim ................. H04N 21/21805 725/32 |

OTHER PUBLICATIONS

Arfwedson, H., et al., "Ericsson's Bluetooth Modules," Ericsson Review, 1999, No. 4, pp. 198-205, <URL:http://www.ericsson.com/ericsson/corpinfo/Pub.s/review/1999_04/files/19990404.pdf>.

Bishop, R., "LabVIEW 8 Student Edition," 2007, 12 pages, Pearson Prentice-Hall, Upper Saddle River, NJ.

First Annual "Better Golf Through Technology," Better Golf Through Technology Conference, Feb. 17-18, 2006, 1 page, [Archived on web.archive.org on Mar. 14, 2006] Can be Retrieved at <URL:https://web.archive.org/web/20060314063211/http:/www.bettergolfthroughtechnology.com/>.

Home Page For "Concept2: Training," 1 page, [Archived on web.archive.org on Feb. 5, 2009] Can be Retrieved at <URL:http://web.archive.org/web/20090205092657/http://concept2.com/us/training/default.asp>.

Home Page For Expresso.com, 2 pages, [Archived on web.archive.org on Apr. 29, 2009] Can be Retrieved at <URL:http://web.archive.org/web/20090426023759/http://expresso.com/products_services/index.html#>.

Honan, M., "Apple unveils iPhone," Macworld, Jan. 89, 2007, 4 Pages, can be retrieved at <URL:http://www.macworld.com/article/1054769/iphone.html>.

Invensense, "InvenSense™ Unveils World's 1st IMU Solution for Consumer Appl.s" InvenSense, Apr. 6, 2010, 2 pages.

Kalia, M., et al., "Efficient Policies for Increasing Capacity in Bluetooth: An Indoor Pico-Cellular Wireless System," IBM India Research Laboratory, 2000, 5 pages.

Linx Technologies, "HP3 Series Transmitter Module Data Guide" Linx Technologies, Inc., 2008, Revised Jul. 27, 2011, 13 Pages.

Otto, C., et al., "System Architecture of a Wireless Body Area Sensor Network for Ubiquitous Health Monitoring," Journal of Mobile Multimedia, 2006, pp. 307-326, vol. 1, No. 4.

Rao, R., et al., "Demand-based Bluetooth Scheduling," Pennsyvania State University, Sep. 27, 2001, 13 pages, Can be retrieved at <URL:http://www.cse.psu.edu/~gik2/papers/Bluetooth1.doc>.

Roving Networks, "Blue Sentry RN-800S-CB Data Sheet," 2009, 1 page.

Sanders, K., "Japanese WII Price, Release Date Revealed," IGN US, Sep. 13, 2006, 1 Page, can be retrieved at <URL:http://www.ign.com/articles/2006/09/14/japanese-wii-price-release-date-revealed>.

Smartswing, "SmartSwing Introduces Affordable Intelligent Golf Club," Press Release, Jul. 19, 2005, 2 pages, [Archived on web.archive.org on Jun. 13, 2006] Can be Retrieved at <URL:https://web.archive.org/web/20060613114451/http://www.smartswing-golf.com/site/news/pr_13 2006_jan_23_aus.html>.

Solid State Technology, "MEMS Enable Smart Golf Clubs," Extension Media, Jan. 6, 2005, 3 pages,[Archived on web.archive.org on Jan. 15, 2016] Can be Retrieved at <URL:https://web.archive.org/web/20160115202844/http://electroiq.com/blog/2005/01/mems-enable-smart-golf-clubs/>.

Takahashi, D., "Facebook, Twitter, Last.fm coming to Xbox Live this fall" Venture Beat, Jun. 1, 2009, 5 Pages, Can be retrieved from <URL:http://venturebeat.com/2009/06/01/facebook-coming-to-xbox-live-as-microsoft-beefs-up-other-entertainment-on-xbox-360/>.

The iClub System™ "iClub.net—Contact," Fortescue Corp. 2001-2005, 1 Page, [Archived on web.archive.org on Apr. 9, 2005] Can be Retrieved at <URL:https://web.archive.org/web/20050409111624/http://www.iclub.net/contact.html>.

The iClub System™ "iClub.net—Products," Fortescue Corp. 2001-2005, 1 Page, [Archived on web.archive.org on Jul. 10, 2005] Can be Retrieved at <URL:https://web.archive.org/web/20050710075533/http://www.iclub.net/products-iclub.html.

The iClub System™ "iClub.net—Products ICLUB$^e$," Fortescue Corp. 2001-2005, 1 Page, [Archived on web.archive.org on Apr. 14, 2005] Can be Retrieved at <URL:https://web.archive.org/web/20050414233840/http://www.iclub.net/products-iclube.html.

The iClub System™ "iClub.net—Products ICLUB (Full Swing)," Fortescue Corp. 2001-2005, 1 Page, [Archived on web.archive.org on Apr. 14, 2005] Can be Retrieved at <URL:https://web.archive.org/web/20050414233828/http://www.iclub.net/products-iclub.html.

The iClub Product Brochure, 2001-2005, 2 pages.

Tuite, D., "Motion-Sensing MEMS Gyros and Accelerometers Are Everywhere," Electronic Design, Jul. 9, 2009, 6 pages, Can be retrieved from <URL:http://electronicdesign.com/analog/motion-sensing-mems-gyros-and-accelerometers-are-everywhere>.

Webster's New College Dictionary, Definition for "Virtual Reality," (3rd ed. 2008), 3 Pages.

Webpage for zigbees.com, 4 Pages, [online] [retrieved on Mar. 14, 2016] Can be retrieved at <URL:http://www.zigbees.com/h_start.htm>.

Wheeler, A, et al., "Introduction to Engineering Experimentation," 2nd Edition, 2004, Chapter 4, 10 pages, Pearson—Prentice-Hall, Upper Saddle River, NJ.

Affidavit of Christopher Butler dated Jan. 15, 2016 regarding "Rinton Press—Publisher in Science and Technology," 6 pages, [Archived on web.archive.org on Jan. 3, 2007] Can be Retrieved at <URL:https://web.archive.org/web/20070103234656/http://rintonspress.com/journals/jmmonline.html>.

Affidavit of Christopher Butler dated Jan. 25, 2016 regarding "SmartWing Intelligent Clubs," 46 Pages, [Archived on web.archive.org on Apr. 11, 2006] Can be Retrieved at <URL:https://web.archive.org/web/20060411113841/http://www.smartswinggolf.com/site/>.

Affidavit of Christopher Butler dated Feb. 19, 2016 regarding "Concept2: Training," 5 pages, [Archived on web.archive.org on Feb. 5, 2009] Can be Retrieved at <URL:http://web.archive.org/web/20090205092657/http://concept2.com/us/training/default.asp>.

Certified File History of U.S. Pat. No. 8,905,855, Feb. 2, 2016, 709 Pages.

Certified File History of U.S. Pat. No. 8,941,723, Feb. 2, 2016, 929 Pages.

File History of U.S. Pat. No. 8,903,521, 2015, 406 pages.

Certified File History of U.S. Pat. No. 8,944,928, Feb. 2, 2016, 647 Pages.

Certified File History of U.S. Pat. No. 9,039,527, Feb. 2, 2016, 1047 Pages.

Declaration of Dr. Steven M. Nesbit, U.S. Pat. No. 8,905,855, Feb. 24, 2016, 235 Pages.

Declaration of Dr. Steven M. Nesbit, U.S. Pat. No. 8,941,723, Feb. 24, 2016, 219 Pages.

(56) References Cited

OTHER PUBLICATIONS

Declaration of Dr. Steven M. Nesbit, U.S. Pat. No. 8,903,521, Feb. 24, 2016, 250 Pages.
Declaration of Dr. Steven M. Nesbit, U.S. Pat. No. 8,944,928, Feb. 24, 2016, 195 Pages.
Declaration of Dr. Steven M. Nesbit, U.S. Pat. No. 9,039,527, Feb. 24, 2016, 227 Pages.
Curriculum Vitae of Dr. Steven M. Nesbit, Feb. 24, 2016, 10 pages.
Claim Limitation Reference Nos. '855 Petition, Feb. 24, 2016, 6 pages.
Claim Limitation Reference Nos. '723 Petition, Feb. 24, 2016, 5 pages.
Claim Limitation Reference Nos. '521 Petition, Feb. 24, 2016, 4 pages.
Claim Limitation Reference Nos. '928 Petition, Feb. 24, 2016, 3 pages.
Claim Limitation Reference Nos. '527 Petition, Feb. 24, 2016, 4 pages.
PCT International Search Report and Written Opinion for PCT/US2016/028968, Jul. 26, 2016, 11 Pages.

\* cited by examiner

MULTI-ANGLE VIDEO EDITING BASED ON CLOUD VIDEO SHARING

BACKGROUND

This invention relates generally to video sharing and particularly to multi angle video editing using cloud video sharing.

With the advancement of mobile computing devices such as smart phones and tablets, more and more people are capable of recording videos of various types of events. For instance, people attending a sports event may use their mobile computing devices to record short footages of the sports event. The users may edit their own videos with mobile applications. For example, multiple people may have recorded a particular moment of the event from different angles and a user may like to use two or more of those videos to generate a single video that transitions from one angle recorded by a camera of a first mobile device to a second angle recorded by a camera of a second mobile device. However, editing and generating a multi-angle video from videos captured from different angles by individual users using their mobile devices is technically challenging and expensive.

In addition, a user may want to perform the video editing using the mobile computing device used to record one of the footages of the event. Mobile computing devices have limited computing capabilities, which renders multi-angle video editing more challenging. Current solutions for multi-angle video editing, e.g., manual selecting and marking different portions of videos captured from different angles, may not be suitable for such mobile computing devices without degrading user experience.

SUMMARY

Embodiments of the invention provide a solution to compose multi-angle videos using videos captured from different angles. A video sharing service stores information associated with multiple videos captured by multiple users for users to compose multi-angle videos. Additionally, a video acquisition engine of a client device captures videos and synchronizes with the video sharing service to allow smooth transitions when switching between angles in the composed multi-angle video. The synchronization can be time-based and the time-based synchronization can be further augmented based on the audio features associated with the multiple videos.

A computer-implemented method for composing a multi-angle video at a client device is disclosed. Embodiments of the method comprise capturing a video to be used in a multi-angle video by a client device associated with a target user. The multi-angle video includes at least a portion of the captured video and portions of other videos captured by other users nearby the target user. Metadata associated with the captured video is determined and the captured video and the metadata are sent to a computer server.

Another aspect provides a computer-implemented method for composing a multi-angle video at computer server. A request to compose a multi-angle video is received from a target user. Videos captured by other users nearby the target user are identified. The identified videos are presented to the target user. A selection of portions of videos captured by the target user and nearby users is received and the multi-angle video is composed based on the selected portions of the videos.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

A solution is provided to compose multi-angle videos captured by mobile computing devices and stored in a cloud computing environment. Multiple users capture videos of a specific event using cameras of mobile computing devices from different angles. The timestamp of the captured videos from each of the mobile computing devices is synchronized to the time of a video sharing server. Additionally, other information such as geolocation (e.g., latitude, longitude, altitude, and orientation) may be determined by the mobile computing devices and associated with the captured videos. The captured videos are sent to the video sharing server, and later accessed by users to compose the multi-angle videos.

Figure 1:
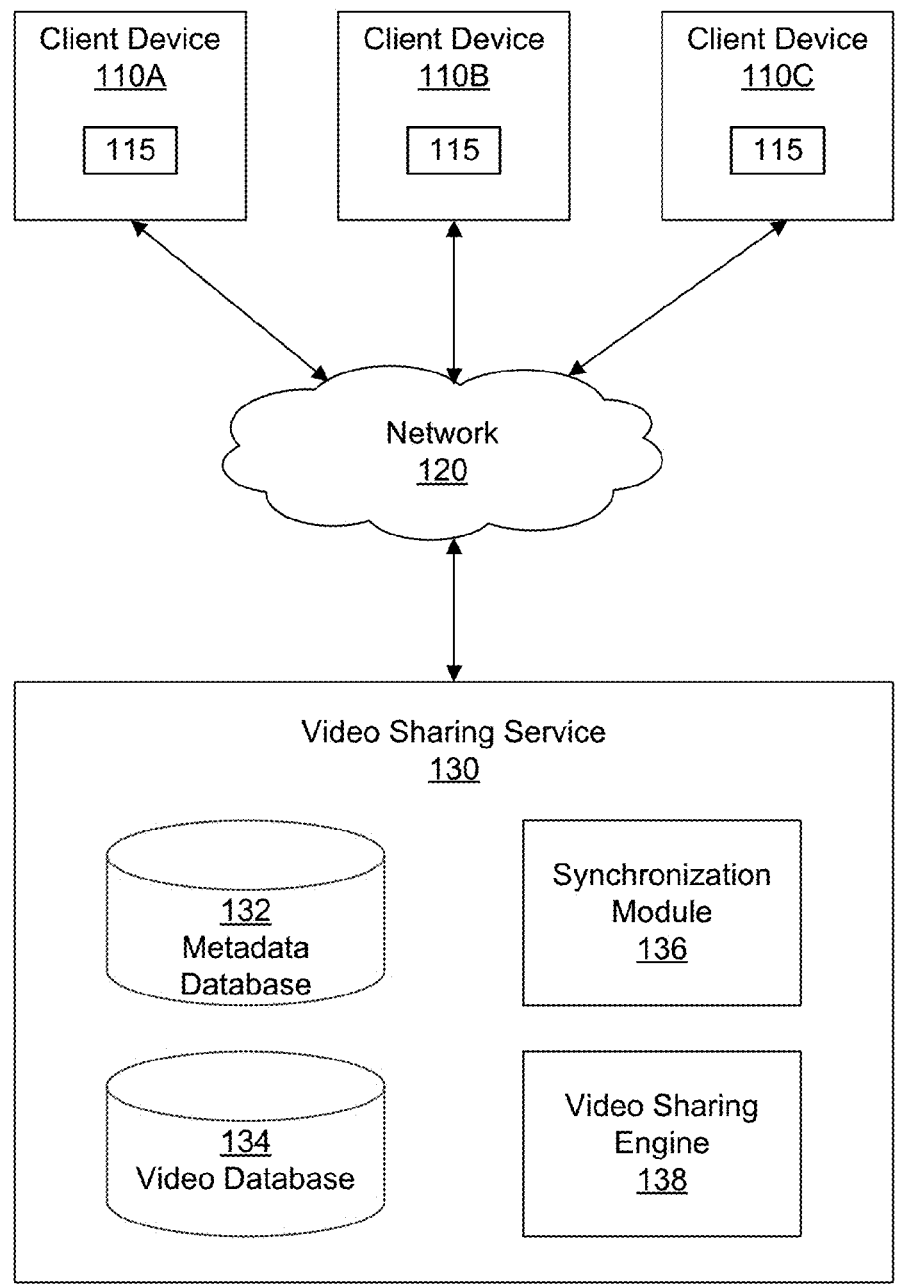
FIG. 1 is a block diagram of a computing environment for composing a multi-angle video, according to one embodiment.

FIG. 1 is a block diagram of a computing environment 100 for composing a multi-angle video, according to one embodiment. The embodiment illustrated in FIG. 1 includes multiple client devices 110 (e.g., 110A, 110B and 110C) and a video sharing service 130 connected to each other by a network 120. Embodiments of the computing environment 100 can have many client devices 110 connected to the network 120. Likewise, the functions performed by the various entities of FIG. 1 may differ in different embodiments.

A client device 110 is an electronic device used by a user to perform functions such as recording digital content, consuming digital content, executing software applications, browsing websites hosted by web servers on the network 120, downloading files, and the like. For example, the client device 110 may be a media streaming device, a smart phone, or a tablet, notebook, or desktop computer. The client device 110 includes and/or interfaces with a display device on which the user may view videos and other content. In addition, the client device 110 provides a user interface (UI), such as physical and/or on-screen buttons, with which the user may interact with the client device 110 to perform functions such as viewing, selecting, and consuming digital content such as sports instructional videos.

In one embodiment, the client device 110 has a video acquisition engine 115 for capturing videos and uploading the videos to the video sharing service 130. In another embodiment, in addition to the video acquisition engine 115, the client device 110 has a video composition module (not shown in FIG. 1) for composing multi-angle videos. The video acquisition engine 115 is further described below with reference to FIG. 3. For simplicity, the video composition module is further described with reference to a corresponding video composition module 430 of a video sharing engine 138 of the video sharing service 130 in FIG. 4.

The video sharing service 130 includes a video database 134 for storing videos captured by the client devices 110, a metadata database 132 for storing metadata associated with the videos stored in the video database 134, a synchronization module 136 for synchronizing the timing of the videos captured by different client devices 110, and a video sharing engine 138 for composing multi-angle videos using videos stored in the video database 134. The video sharing engine 134 is further described below with reference to FIG. 4.

In this disclosure, "video content," "digital content" or "digital media content" generally refers to any machine-readable and machine-storable work. Digital content can include, for example, video, audio or a combination of video and audio. Alternatively, digital content may be a still image, such as a JPEG or GIF file or a text file. For purposes of simplicity and the description of one embodiment, the digital content will be referred to as a "video," "video files," or "video footages," but no limitation on the type of digital content that can be analyzed are intended by this terminology.

The network 120 enables communications among the client device 110 and the video sharing service 130. In one embodiment, the network 120 comprises the Internet and uses standard communications technologies and/or protocols, e.g., a 4G LTE mobile network. In another embodiment, the entities can use custom and/or dedicated data communications technologies.

Computing System Architecture

Figure 2:
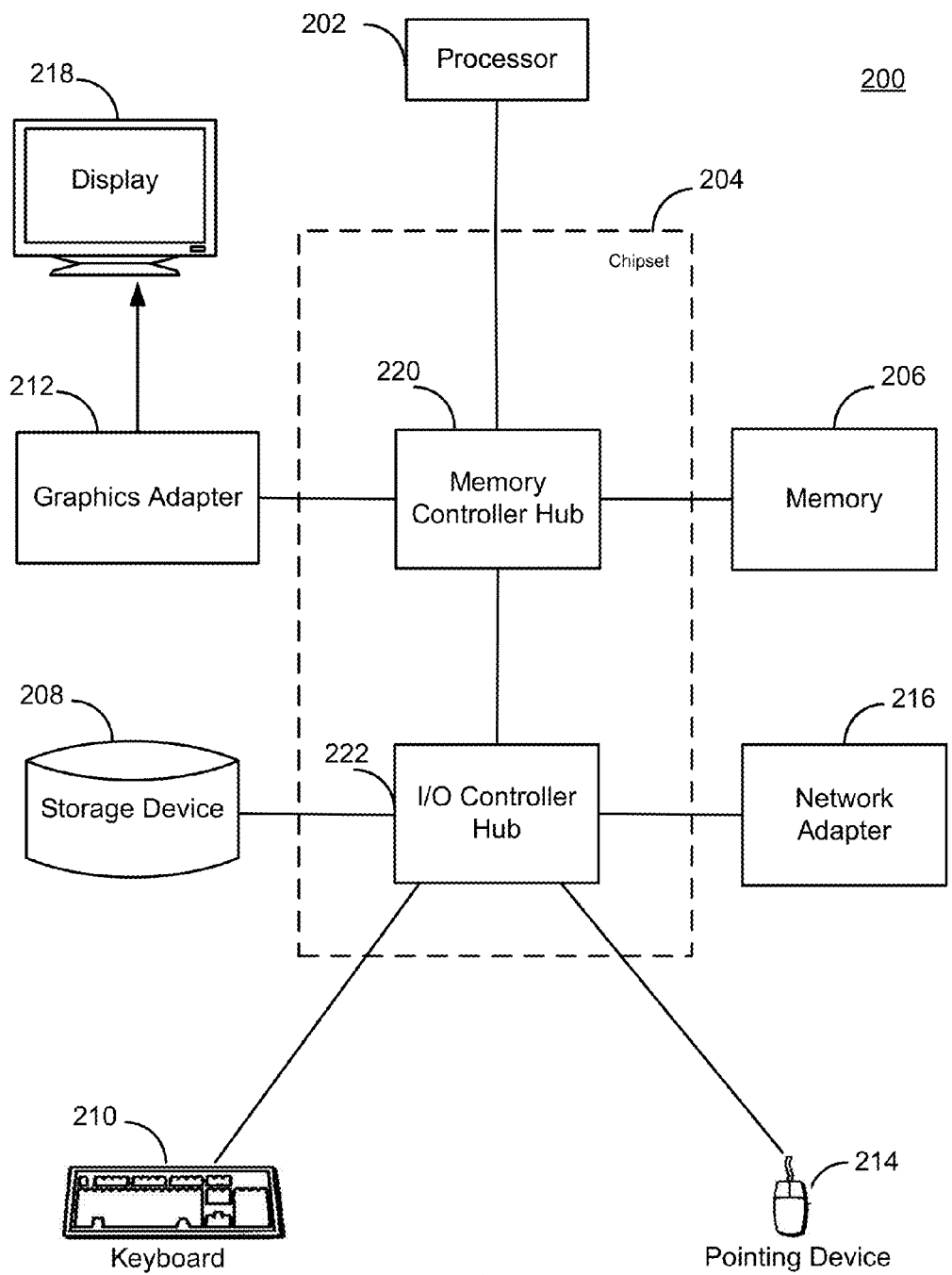
FIG. 2 is a block diagram illustrating an example of a computer acting as a video sharing service and/or a client device, according to one embodiment.

The entities shown in FIG. 1 are implemented using one or more computers. FIG. 2 is a high-level block diagram of a computer 200 for acting as the video sharing service 130 and/or a client device 110 according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 120.

As is known in the art, a computer 200 can have different and/or other components than those shown in FIG. 2. In addition, the computer 200 can lack certain illustrated components. For example, the computers acting as the video sharing service 130 can be formed of multiple blade servers linked together into one or more distributed systems and lack components such as keyboards and displays. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Video Acquisition for Multi-Angle Videos Composition

Figure 3:
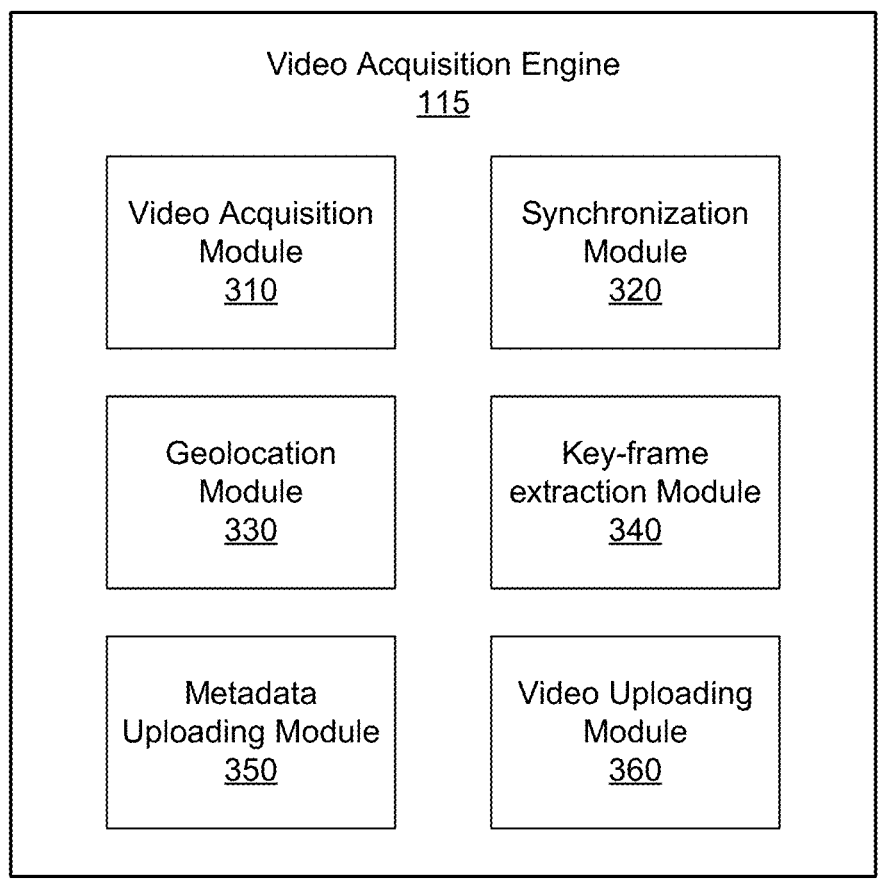
FIG. 3 is a block diagram of a video acquisition engine, according to one embodiment.

Multiple users may capture videos of a same sports event from different angles using cameras of mobile computing devices. FIG. 3 is a block diagram of a video acquisition engine 115 of a client device 110 according to one embodiment. The video acquisition engine 115 captures videos, e.g., a live soccer game, and uploads the videos to the video sharing service 130. In one embodiment, the video acquisition engine 115 has a video acquisition module 310, a synchronization module 320, a geolocation module 330, a key-frame extraction module 340, a metadata uploading module 350, and a video uploading module 360. Other embodiments of the video acquisition engine 115 can have different and/or additional computer modules, e.g., a presentation module to present multi-angle videos generated by a video sharing service. Likewise, the functions performed by the various entities of FIG. 3 may differ in different embodiments.

The video acquisition module 310, e.g., the embedded digital camera of a smart phone, captures a video of an event, such as a sports event. For instance, the video acquisition module 310 captures a video of a soccer match, or a video of a basketball match. The video acquisition module 115 may capture videos in any format and/or resolution. In some embodiments, the video acquisition module 115 captures a video in a format and resolution specified by a user using a client device 110. A captured video includes multiple video frames, each of which has an associated timestamp representing the timing information relative to other video frames of the captured video.

The synchronization module 320 synchronizes a timestamp of a video captured by the video acquisition module 310 with a clock from the synchronization module 136 of the video sharing service 130. In some embodiments, the synchronization module 320 of client device 110 and synchronization module 136 of the video sharing service 130 use a clock synchronization algorithm, such as Cristian's algorithm, or the network time protocol (NTP). For instance, the synchronization module 320 of the client device 110 may send a request to the synchronization module 136 of the video sharing service 130. The synchronization module 136 of the video sharing service 130 sends a respond containing the clock time of the synchronization module 136. The synchronization module 320 of the client device 110 may additionally determine the round trip time (RTT) for a packet to travel back and forth from the client device 110 to the video sharing service 130. The video synchronization module 320 may then determine the current time of the captured video to be the time included in the response from the synchronization module 136 of the video sharing service 130 plus half of the round trip time.

The geolocation module 330 determines the location of the client device 110 when the video acquisition module 310 captures a video, and tags the video captured by the video acquisition module 310 with the determined location. For example, the geolocation module 330 determines the latitude and longitude of the client device 110 using a global positioning system (GPS) receiver. The geolocation module 330 may store metadata corresponding to a coordinate value (e.g. latitude and longitude) associated with a captured video in a local repository or provide the metadata to the metadata uploading module 350 for further processing. The geolocation module 330 may additionally determine other geolocation parameters, such as elevation, and orientation.

The key-frame extraction module 340 extracts key frames from the videos captured by the video acquisition module 310. A key-frame is a video frame selected to indicate the beginning or end of a change made to the audio/video signals of the video. For example, a key-frame is set to indicate the point at which audio signals of a sports video start fading down to a threshold level. In some embodiments, the key-frame extraction module 340 extracts frames for every set number of frames (e.g., extracting the first frame of every 30 frames), or at a set time period (e.g., extracting a frame every 30 seconds).

Additionally, the key-frame extraction module 340 may generate low resolution images for the extracted key-frames to be uploaded to the video sharing service 130. Uploading low resolution images for the extracted key-frames, instead of the key-frames of original resolution, reduces the bandwidth requirements for mobile computing devices. For instance, the low resolution images may be used by the video sharing service 130 as thumbnails of the key-frames of the video captured by the video acquisition module 310. In embodiment, the key-frame extraction module 340 generates low resolutions images for the extracted key-frames by compressing the extracted key-frames. Any video compression schemes known to those of ordinary skill in the art can be used by the key-frame extraction module 340 to compress the extracted key-frames.

The metadata uploading module 350 uploads metadata associated with videos captured by the video capturing module 310 to the video sharing service 130. Examples of metadata associated with a video captured by the video capturing module 310 include geolocation information of the video, time information of the video, identification of extracted key-frames and corresponding low resolution image of the key-frames. For instance, the metadata uploading module 350 uploads geolocation information determined by the geolocation module 330 and time information determined by the synchronization module 320. The metadata uploading module may additionally upload identification of key-frames or low resolution images corresponding to the key-frames extracted by the key-frame extraction module 340.

In some embodiments, the metadata uploading module 350 uploads the metadata soon after the video acquisition module 310 has captured the video footage of the event. For instance, the metadata uploading module 350 may upload the metadata immediately after the video acquisition module 310 has finished capturing the video footage. In some embodiments, the metadata uploading module 350 may upload metadata while the video acquisition module 310 is capturing a video footage. For instance, metadata uploading module 350 may upload time information, geolocation information, and/or identification of key-frames to the video sharing service 130 even before the video acquisition module 310 has finished capturing the video footage.

The video uploading module 360 uploads video footages captured by the video acquisition module 310 to the video sharing service 130. In one embodiment, the video uploading module 360 upload low resolution images corresponding to the key-frames extracted by the key-frame extraction module 340. In some embodiments, the video uploading module 360 may wait until the client device 110 has a fast internet connection before uploading the captured video. For instance, the video uploading module 360 may wait until the client device is connected via a wireless local area network (WLAN). In other embodiments, the video uploading module uploads the videos captured by the video acquisition module in response to receiving an instruction from the user of the client device 110.

Multi-Angle Video Composition and Sharing

Referring back to FIG. 1, the video sharing service 130 includes the metadata database 132, the video database 134, the synchronization module 136, and the video sharing engine 138. The video database 134 stores videos captured by client devices 110. The metadata database 132 stores metadata associated with videos stored in the video database 134. In one embodiment, the metadata stored in the metadata database 132 is received from the client devices 110 that provided the associated videos. The synchronization module 136 of the video sharing service 130 communicates with the synchronization module 320 of the video acquisition engine 115 of the client device 110 to synchronize the timing of the videos captured by the client devices 110. The video sharing engine 138 allows users to compose multi-angle videos using videos stored in the video database 132.

The synchronization module 136 synchronizes the timing of the videos captured and uploaded by the client devices 110 to the video sharing service 130. Each client device 110 may have a different internal time and a video captured by the client device 110 has the internal time of the client device 110 as its timestamp. When composing a multi-angle video using footages recorded with multiple client devices, if the timing associated with the different video footages is not synchronized, the composed video may not be continuous in time, e.g., jittering appearance to human viewers. For instance, a user may compose a video using footages from a first client device and footages from a second client device, where the internal time of the first client device and the internal time of the second client device differ by one second. The composed video may have a one-second gap in time when switching between the footages recorded by each of the client devices due to the difference in the internal time between the first client device and the second client device.

In one embodiment, the synchronization module 136 synchronizes an internal time associated with each video captured by a client device 110 with a system clock of the synchronization module 136. For example, upon receiving a clock synchronization request form a client device 110, the synchronization module 136 sends a respond containing the clock time of the synchronization module 136. The video synchronization module 320 of the client device 110 sets the current time of the video to be the time included in the response from the synchronization module 136, where the current time is associated with a low resolution image of a key-frame to be uploaded to the video sharing service 130 by the client device 110.

Under certain circumstances, the synchronization module 136 may not be able to properly synchronize the time with every client device 110. For instance, client devices 110 may be in a busy network (e.g., in a concert where thousands of people are concurrently connected to a single network) where the latency for transmitting and receiving data between a client device 110 and the video sharing service 130 is large. The synchronization module 136 may use audio features of multiple videos to synchronize the videos when a time-based synchronization between the video sharing service 130 and a client device 110 was not successful.

In some embodiments, the synchronization module 136 determines whether a time-based synchronization was unsuccessful or whether the likelihood that a time-based synchronization between the video sharing service 130 and a client device 110 is inaccurate is higher than a threshold. For instance, the synchronization module 136 may determine the latency to reach multiple client devices (e.g., by determining the roundtrip time (RTT) of a packet between the video sharing service 130 and the client devices 110). To determine the RTT for a client device 110, the video sharing service 130 may send a request to the client device 110 and measure the time it takes to receive an acknowledgement from the client device 110. The synchronization module 136 then determines that the likelihood that the time synchronization is inaccurate is high based on the determined latencies. For example, if the variance between RTT based latencies for different client devices 110 is larger than a latency threshold, the synchronization module 136 determines that the likelihood that the time synchronization is inaccurate is high.

To improve the accuracy of synchronizing multiple videos captured from multiple, the synchronization module 136 selects an audio signature (also referred to as a "sound pattern") associated a video of the multiple videos and determines whether the selected sound pattern appears in other videos of the video videos. Based on the sound pattern determination, the synchronization module 136 determines whether to adjust the timing associated with each video.

Figure 10:
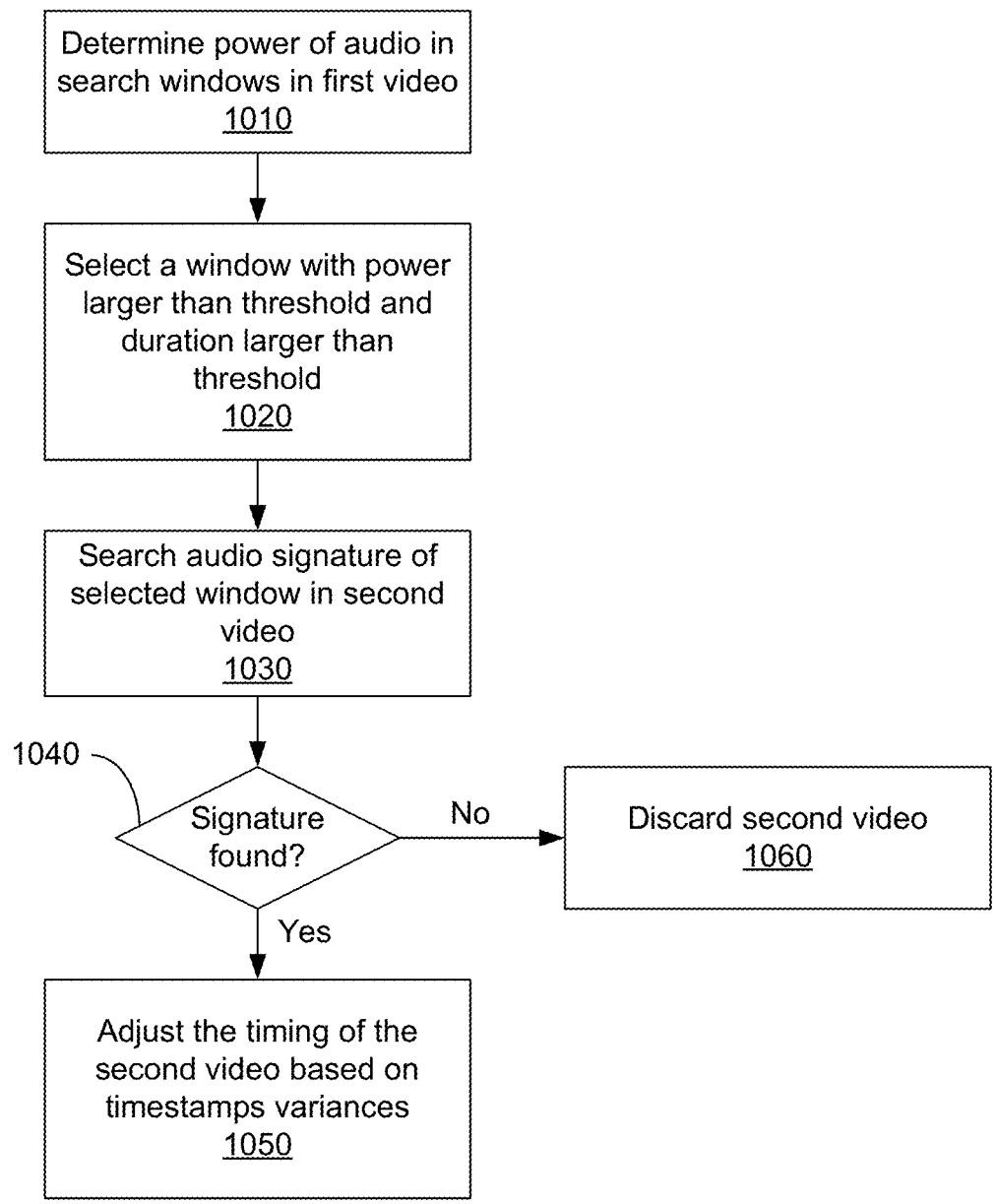
FIG. 10 is a flow diagram of a process for synchronizing two videos captured from multiple angles based on sound patterns associated with the videos, according to one embodiment.

FIG. 10 is a flow diagram of the process for synchronizing a first video and a second video of the multiple videos captured from multiple angles based on the sound patterns associated with the videos. The example illustrated in FIG. 10 only shows the synchronization between two videos; the similar steps can be applied to more videos captured from multiple angles. It is noted that if the first video and the second video were concurrently recorded by nearby users, the first video and the second video may contain segments with similar audio signatures. For instance, if the first video and the second video were recorded during a concert, both videos may include the audio signature of the singer singing a specific song or portion of the song at a particular timer period. Similarly, if the videos were recorded during a soccer match, both videos may include the audio signature of the crowd celebrating a goal, or the ball hitting a post.

To synchronize the first and second videos, the synchronization module 136 selects a sound pattern associated with the first video as a reference audio signature and determines 1010 the power of the audio signal in multiple search windows of the first video. The synchronization module 136 selects 1020 a search window that has a power larger than a sound power threshold value and a duration larger than a duration threshold value, e.g., 2 seconds. For instance, the synchronization module 136 may select the search window that has the largest power for at least 2 seconds of the audio signals of the first video. The sound power of the selected search window presents the reference audio signature of the first video.

The synchronization module 136 searches 1030 the audio signature of the selected window in the second video. To search for the audio signature, the synchronization module 136 analyzes the audio signals of the second video in frequency spectrum of the selected window and searches for a window in the second video with a similar frequency spectrum associated with the audio signature of the first video. If the audio signature is found 1040 in the second video, the synchronization module 136 calculates the variance between the RTT timestamp of a video segment with the audio signature of the first video and the RTT timestamp of a video segment with the audio signature of the second video. Based on the calculated timestamps variance, the synchronization module 136 determines whether to adjust the timing of the second video.

In one embodiment, the synchronization module 136 compares the calculated timestamps variance with a variance threshold value. Responsive to the variance smaller than the variance threshold value, the synchronization adjusts 1050 the timing of the second video; otherwise, no timing adjustment is performance. For example, the timing of the second video is shifted based on the comparison of the timestamp variance and the variance threshold value. If the audio signature is not found in the second video, the second video is discarded 1060. If there are more than two videos to be synchronized, the synchronization module 136 repeats the same steps of 1030-1060 on the additional videos. In some embodiments, if the audio signature is found in multiple locations (e.g., due to echo in the sound included in the second video), the first window that includes the audio signature is used to synchronize the first video and the second video.

Figure 4:
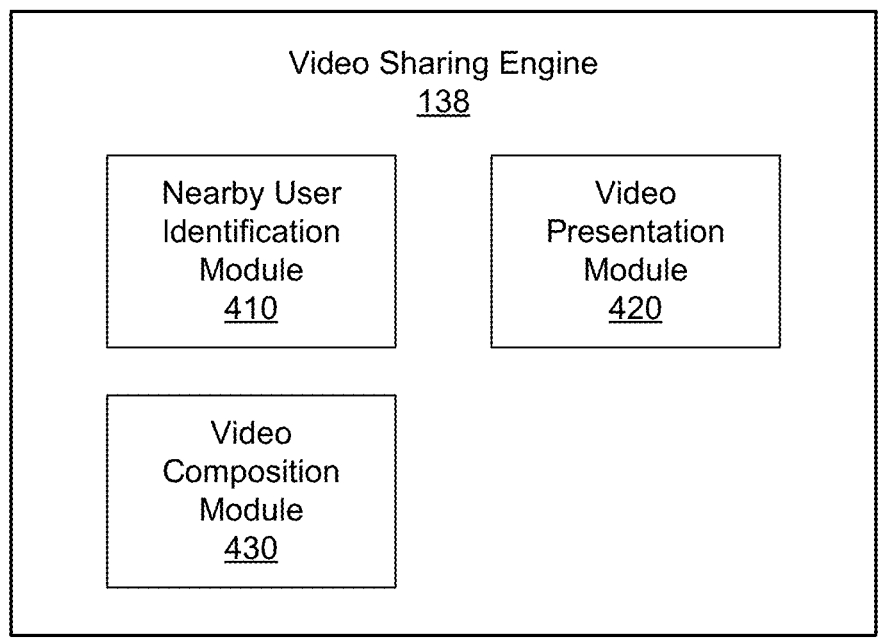
FIG. 4 is a block diagram of a video sharing engine, according to one embodiment.

The video sharing engine 138 allows users to compose multi-angle videos using videos stored in the video database 132. FIG. 4 illustrates a block diagram of the video sharing engine 138, according to one embodiment. The video sharing engine 138 includes a nearby user identification module 410, a video presentation module 420, and a video composition module 430.

Multiple users may capture videos of a sports event from different angles using cameras of mobile computing devices and a user may want to compose a video using video footages captured by other users from different angles. For a specific video recorded by a user, the nearby user identification module 410 identifies other videos captured by other users that were nearby the user who recorded the specific video. To simplify the description of one embodiment of the video sharing engine 138, the user for whom the nearby user identification module 410 identifies other users nearby is referred to as the "target user" from herein. In one embodiment, the nearby user identification module 410 uses metadata, e.g., geolocation information, of the captured videos, to identify other users that were nearby the target user.

Figure 5A:
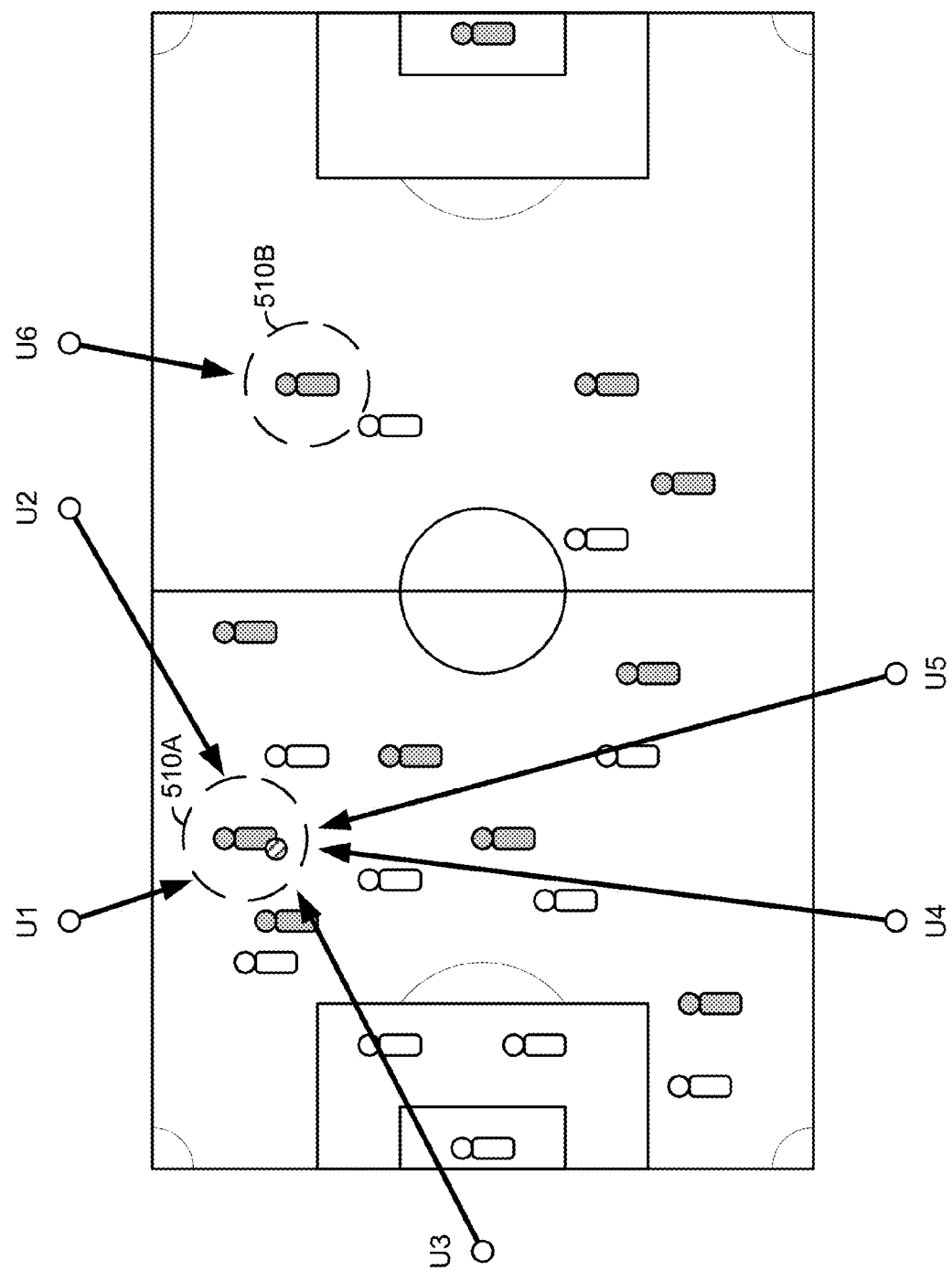
FIG. 5A is a top view diagram of multiple users capturing footages of a sports event, according to one embodiment.

FIG. 5A illustrates a top view diagram of multiple users capturing footages of a sports event. In the example of FIG. 5A, six users U1, U2, U3, U4, U5 and U6 are capturing video footages of a soccer game. In particular, users U1, U2, U3, U4 and U5 are taking video footages of the player 510A who has the soccer ball, while user U6 is taking video footages of player 510B. User U1 is the target user, who may want to compose a video using video footages captured by user U1, U3 and U4.

The nearby user identification module 410 uses information included in the metadata database 132 to identify that users U2 through U6 were located nearby target user UI. For instance, the nearby user identification module 410 uses geolocation information, e.g., latitude and longitude, associated with the videos captured by users U2 and U6 and compares the geolocation information with the geolocation information associated with the video recorded by user U1. Responsive to the videos captured by users U2 through U6 having similar latitude and longitude as the video recorded by user U1, the nearby user identification module 410 determines that users U2 through U6 were nearby user U1.

To augment the determination based on the comparison of geolocation information among the videos captured by users U1 through U6, the nearby user identification module 410 may further compare the timing information associated with the videos captured by users U1 through U6. Videos captured by users U2 through U6 at the same time interval as the video captured by user U1 increases the probability that users U2 through U6 were nearby user U1.

Figure 5B:
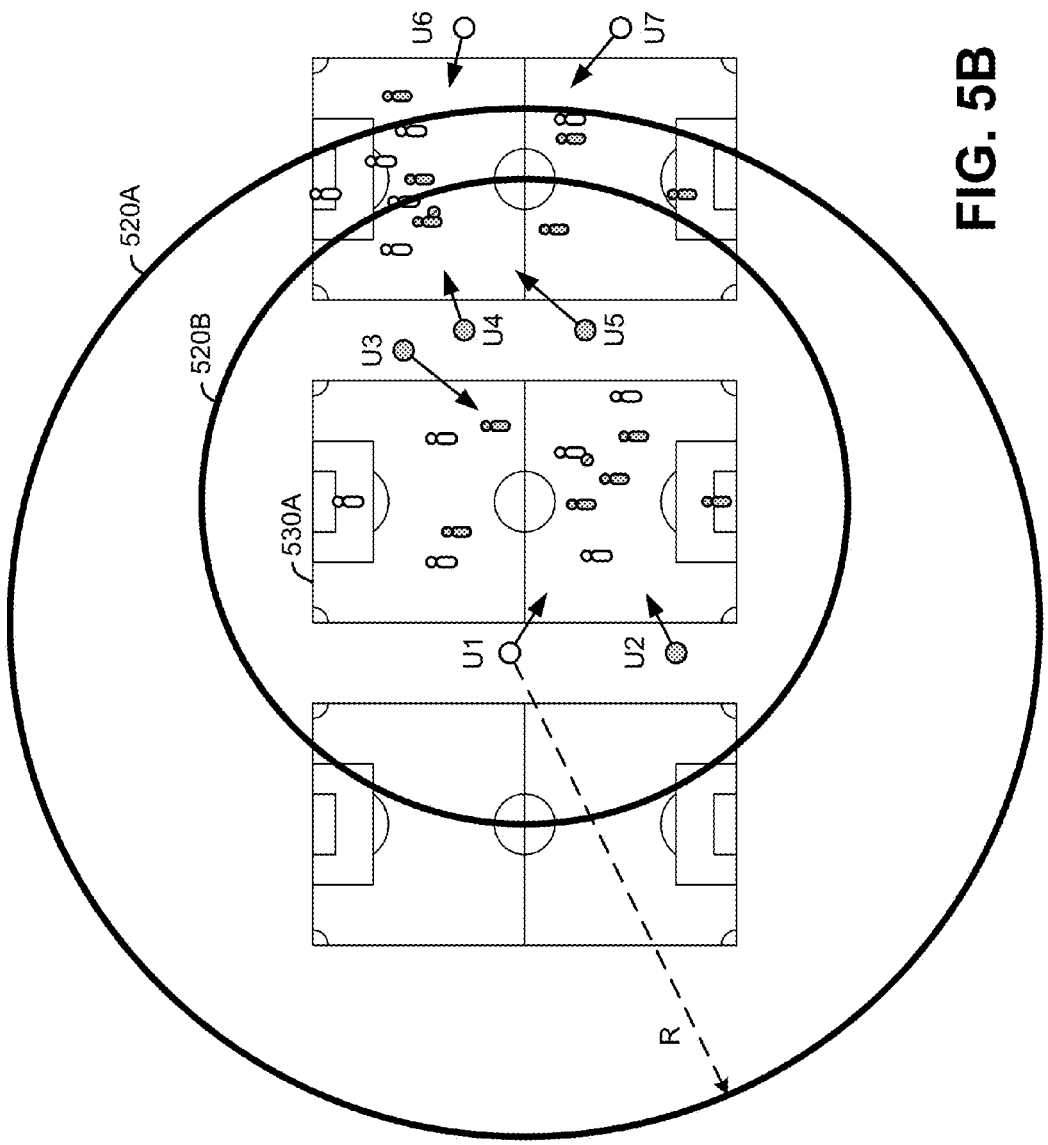
FIG. 5B is a top view diagram of multiple users capturing footages of multiple sports events, according to one embodiment.

In another embodiment, as illustrated in FIG. 5B, the nearby user identification module 410 selects users that are within a predetermined area measured by a distance (R) from the target user U1. For example, if user U1 is composing a multi-angle video using videos captured by other users nearby, the nearby user identification module 410 identifies users that are inside a circle 520A with radius R and centered at the location of user U1. In the example of FIG. 5B, users U2, U3, U4, and U5 are selected because they are within the circle 520A centered at the location of user U1, and users U6 and U7 are not selected because they are outside the circle 520A.

In some embodiments, the nearby user identification module 410 takes into consideration the angles the cameras are pointing to identify the nearby users. For instance, users may be near a target user based on their geolocation, but the cameras used by the users are pointing at a different location than the one pointed by target user U1. The nearby user identification module 410 identifies these users, whose videos are not selected and used by the target user U1 to compose his/her multi-angle videos. In the example of FIG. 5B, users U2, U3, U4 and U5 are nearby the target user U1 based on their geolocation, e.g., users U2 through U5 are all within the same circle 520B centered at the middle of the soccer field 530A. However, the cameras of users U4 and U5 are pointed to a different soccer field than the direction pointed by target user U1's camera. The nearby user identification module 410 selects users U3, U4, and U5 as the users nearby the target user U1, and does not select users U4 and U5.

In yet other embodiments, the nearby user identification module 410 may identify a sports field, or a building that is in the field of view of target user U1 and uses the identified field to select users that are nearby the target user U1. Taking FIG. 5B as an example, the nearby user identification module 410 identifies soccer field 530A to be in the field of view of the target user U1. The nearby user identification module 410 identifies users that are located inside a circle 520B located around field 530A as the users nearby the target user U1, whose videos can be used by the target user U1 to compose multi-angle videos.

Figure 5C:
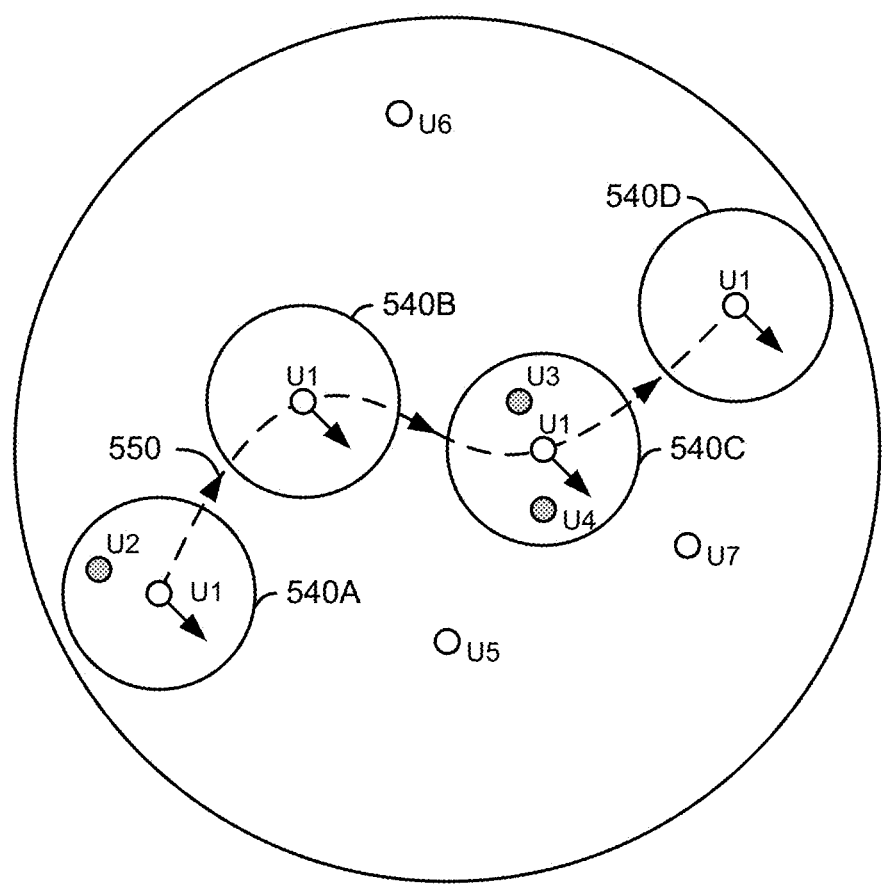
FIG. 5C is a diagram of a user moving across multiple other users capturing footage of sports events, according to one embodiment.

In some embodiments, the nearby user identification module 410 identifies different users as the target user U1 moves from one place to another, or as other users move in or out of a predetermined circle of area used to identify the nearby users. For instance, FIG. 5C illustrates a diagram of a user moving across multiple other users capturing video footages of sports events. As user U1 moves along path 550, a circle 540 with a predetermined diameter is used to identify the nearby users also move. For instance, when the user U1 is at a first position, a first circle 540A is used to identify nearby users. Using circle 540A, user U2 is identified as being nearby user U1 because user U2 is inside the first circle 540A. As user U1 moves along path 550 to a second position, where a second circle 540B is used to identify nearby users. At this position, no nearby users are identified since no users, other than user U1, are inside circle 540B. User U1 then moves along path 550 to a third position, where a third circle 540C is used to identify nearby users. At this position, two users U3 and U4 are identified as being nearby user U1 because they are inside the third circle 540C. As user U1 moves to a fourth location, a fourth circle 540D is used to identify nearby users. In the example of FIG. 5C, no other users are identified as being nearby user U1 because no other users are inside the fourth circle 540D.

Referring back to FIG. 4, the video presentation module 420 presents video footages captured by nearby users identified by the nearby user identification module 410 to a target user. For instance, for the exemplary situation of FIG. 5A, the video presentation module 420 presents video footages from users U2, U3, U4, and U5 to target user U1. User U1 may compose a multi-angle video using one or more video footages from identified nearby users in addition to videos captured by user U1 him/herself.

Figure 6:
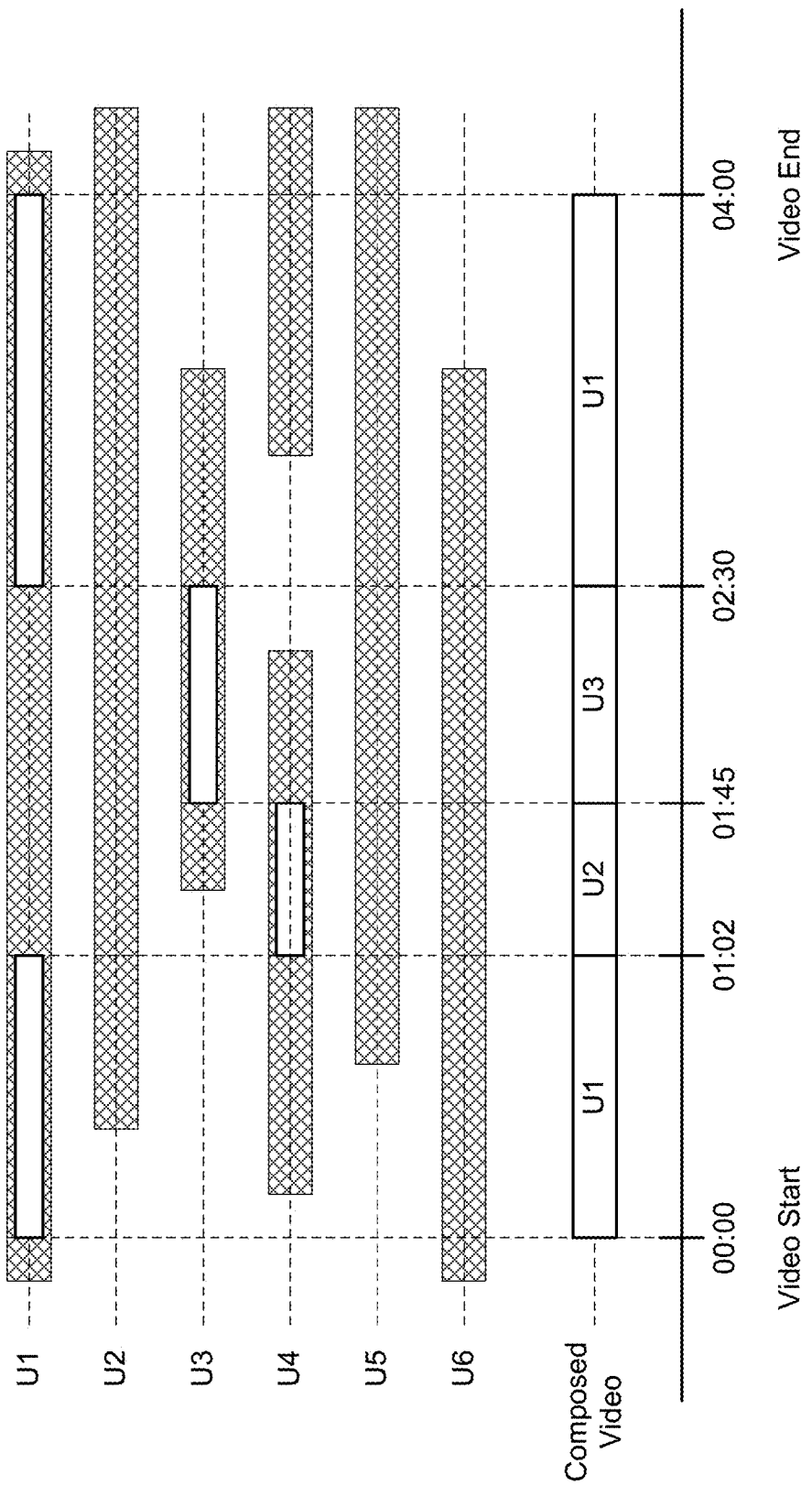
FIG. 6 is a diagram illustrating available videos from nearby users and a user's video sequence selection for generating a multi-angle video, according to one embodiment.

To further illustrate multi-angle video composition by a target user, FIG. 6 is a diagram illustrating available videos from nearby users and a user's video sequence selection for generating a multi-angle video, according to one embodiment. As illustrated in FIG. 6, users U1, U2, U3, U4, U5, and U6 recorded video footages of a soccer game within time 00:00 and time 04:00. For instance, the shaded boxes indicate the periods of time where each of the users has recorded video footages of the soccer game. The solid boxes on top of the shaded boxes indicate portions of the video footages that user U1 has chosen to compose the composed video. The video presentation module 420 presents the videos (i.e., the videos represented by shaded boxes in FIG. 6) that were recorded by nearby users during the period of time target user U1 was recording a video of the soccer game.

In some embodiments, the video presentation module 420 shows previews (e.g., lower resolution images of key-frames from the videos captured by the nearby users). In other embodiments, the video presentation modules 420 presents an identification of the periods of time where nearby users have captured video footages of the sports event. In the example shown in FIG. 6, the presentation module 420 shows the timing information (e.g., start and end) of each video sequence chosen by the target user U1 in the composition of a multi-angle video. For example, target user U1 has chosen the portion of the video footage recorded by him/self from time 00:00 to time 01:02, the portion of the video footage recorded by user U2 from 01:02 to 01:45, the portion of the video footage recorded by user U3 from 01:45 to 02:30, and the portion of the video footage recorded by target user U1 from 02:30 to 04:00.

Referring back to FIG. 4, the video composition module 430 receives video footages selection from a target user composing a multi-angle video and generates the multi-angle video using portions of video footages selected by the target user. The video composition module 430 retrieves the selected videos selected by the target user from the video database 134 and composes the multi-angle video based on the retrieved videos. Although the video composition module 430 is described here in conjunction with the video sharing service 130, the functions described here can be similarly performed by a corresponding video composition module at a client device 110.

In some embodiments, if one or more nearby users have only uploaded the metadata for the video footages (e.g., the geolocation information, the timing information, and the key-frames) and has not uploaded the videos, the video composition module 430 may notify the target user composing the multi-angle video that one or more of the videos are not yet available. In some embodiments, the video composition module 430 generates the multi-angle video when the missing videos are received from the one or more nearby users. For instance, if nearby users U2 and U4 have uploaded metadata and videos, and nearby users U3 and U5 have uploaded metadata but have not uploaded the videos; and user U1 selects portions of videos captured by users U1, U3 and U4 to be included in a multi-angle video, the video composition module 430 may compose the multi-angle video when the video captured by user U3 is uploaded to the video sharing service 130. In some embodiments, the video composition module 430 may send a notification to user U3 to upload the video captured by user U3.

Figure 7:
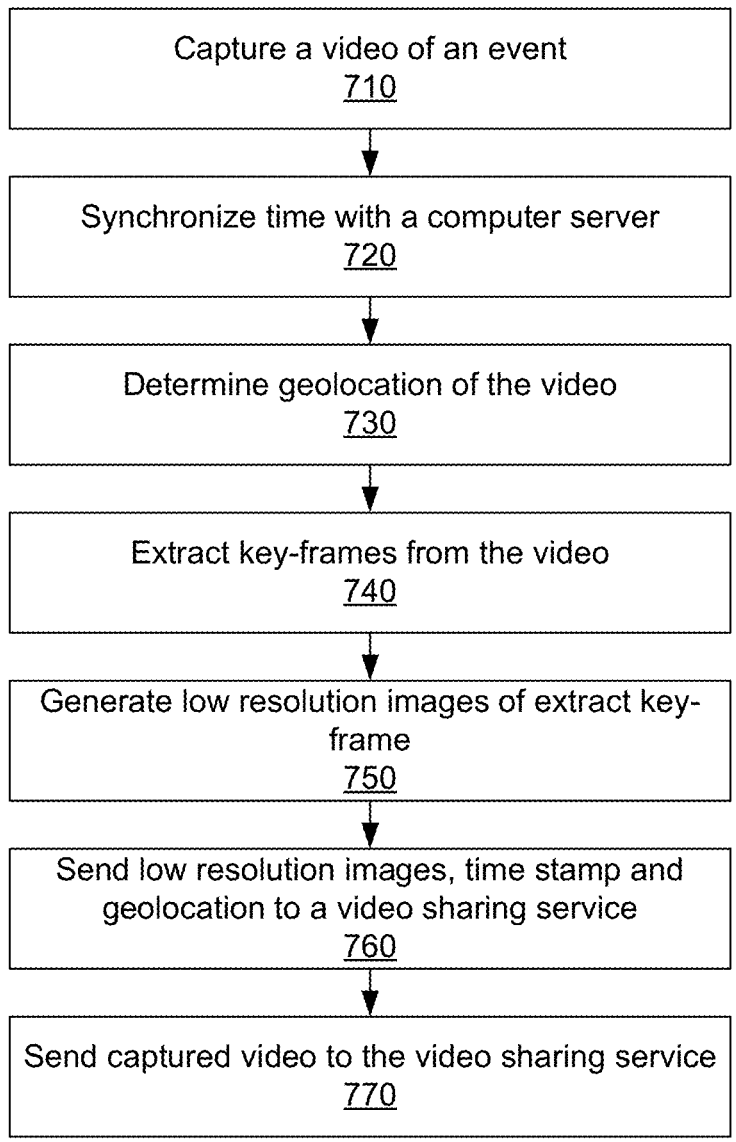
FIG. 7 is a flow diagram of a process for uploading a video footage for multi-angle video composition, according to one embodiment.

FIG. 7 is a flow diagram of a process for uploading a video footage for multi-angle video composition, according to one embodiment. Initially, the video acquisition engine 115 of a client device 110 captures 710 a video of an event, e.g., a soccer game, using a digital camera of the client device 110. The video acquisition engine 115 synchronizes 720 the time of the video captured by the client device 110 with the time of the video sharing service 138.

The video acquisition engine 115 determines 730 the location of the client device 110. For instance, the geolocation module 330 of the video acquisition engine 115 may determine a latitude and longitude value using a GPS receiver. The video acquisition engine 115 extracts 740 key frames from the video captured by the client device 110 and generates 750 low resolution images of the extracted key-frames. The video acquisition engine 115 sends 760 the low resolution images of the extracted key-frames, the synchronized time stamp of the captured video, and the geolocation of the client device 110 at the time the video was captured to the video sharing service 130.

The video acquisition engine 115 sends 770 the captured video to the video sharing service 130.

Figure 8:
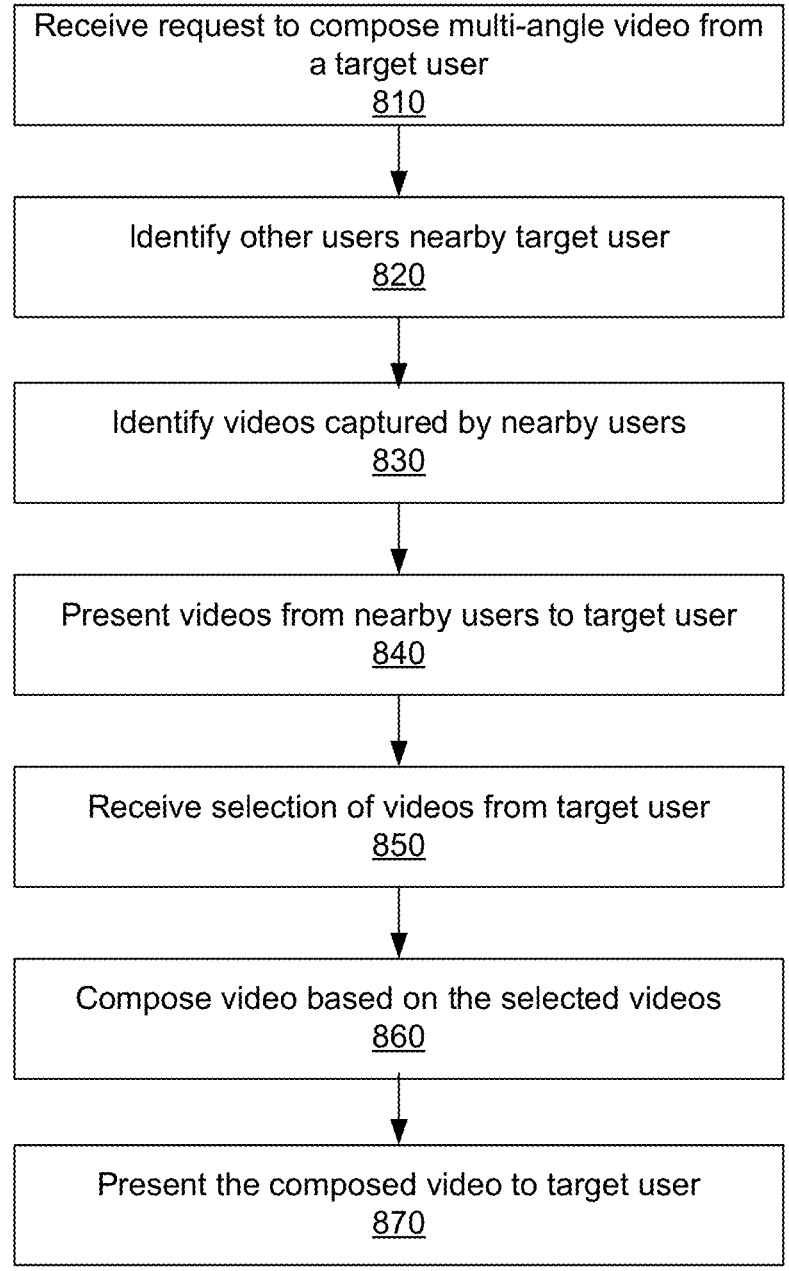
FIG. 8 is a flow diagram of a process for composing a multi-angle video with video footages captured from multiple angles at a video sharing service, according to one embodiment.
Figure 9:
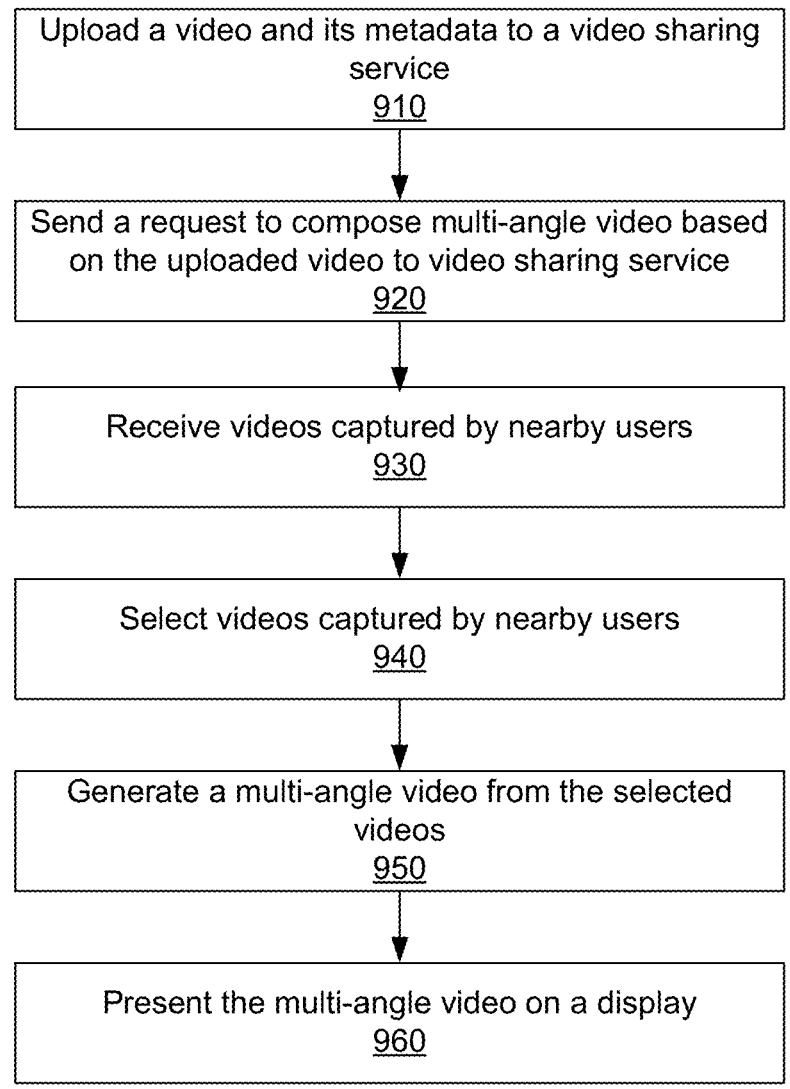
FIG. 9 is a flow diagram of a process for composing a multi-angle video with video footages captured from multiple angles at a client device, according to one embodiment.

FIG. 8 illustrates a flow diagram of a process for composing a multi-angle video for a target user from multiple video footages captured by other users nearby the target user. Initially, the video sharing engine 138 receives 810 a request from a target user to compose a multi-angle video. The video sharing engine 138 identifies 820 other users nearby the target users and identifies 830 videos captured by nearby users. The video sharing engine 138 presents 840 the identified videos from nearby users to the target user. The video sharing engine 138 receives 850 a selection of videos or portions of videos captured by the target user him/herself and nearby users. The video sharing engine 138 composes 860 the multi-angle video based on the selected videos, e.g., by combining the selected videos according to their timestamps. The video sharing engine 138 presents 870 the composed video the target user.

As mentioned earlier, multi-angle video composition from videos captured from different angles can be similarly performed at the client device 110 by a video composition module of the client device 110. Initially, the client device 110 captures and uploads 910 a video to the video sharing service 130 as described with reference to FIG. 7. The client device 110 associated with a user who uploaded the video, i.e., a target user, sends 920 a request to compose a multi-angle video based on the uploaded video to the video sharing service 130. The video sharing service 130 identifies other users nearby the target user around the same time when the target user took the uploaded video. The video sharing service 130 retrieves the videos captured by the identified nearby users and sends the videos to the client device 110. The client device 110 receives 930 the videos captured by the identified nearby users and selects 940 one or more videos or portions of videos from the received videos. The client device 110 generates 950 a multi-angle video from the selected videos and/or video portions and presents 960 the generated video to the target user on a display of the client device 110.

Figure 11:
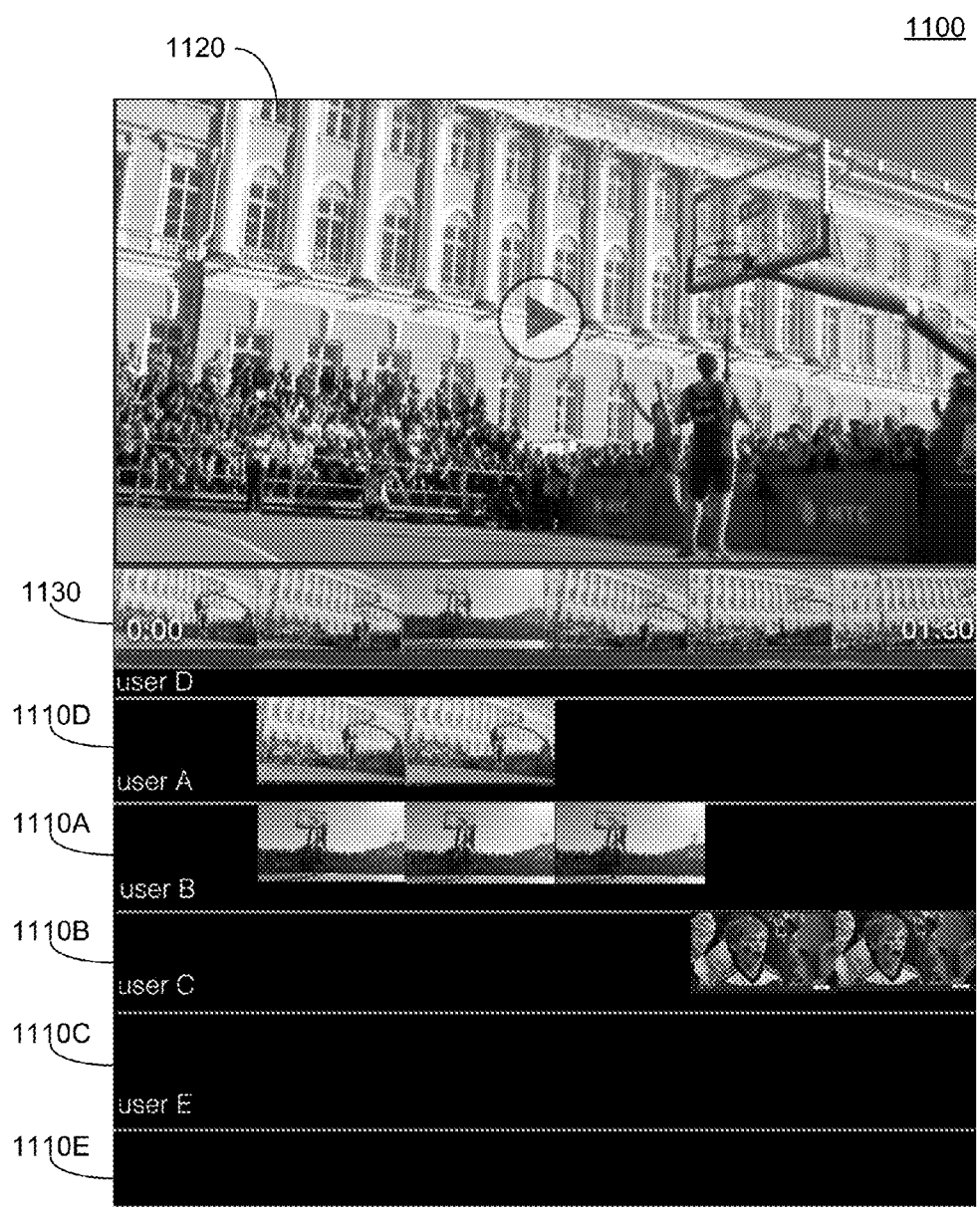
FIG. 11 is an exemplary user interface for composing a multi-angle video with video footages captured from multiple angles, according to one embodiment.

FIG. 11 illustrates an exemplary user interface 1100 for composing a multi-angle video with video footages captured from multiple angles. The user interface 1100 includes a graphical user interface (GUI) element 1110 to present videos captured by nearby users. The exemplary graphical user interface 100 of FIG. 11 includes a GUI element 1110 to present videos captured by 5 different users (e.g., GUI element 1110A for presenting videos from user A, GUI element 1110B for presenting videos from user B, GUI element 1110C for presenting videos from user C, GUI element 1110D for presenting videos from user D, and GUI element 1110E for presenting videos from user E). In some embodiments, a GUI element 1110 shows the key-frames of the videos captured by a user. The user composing the multi-angle video may select videos or portions of videos captured by nearby users. In the example of FIG. 11, user D is composing a multi-angle video using a portion of video captured by user A, a portion of video captured by user B, a portion of video captured by himself/herself.

The graphical user interface 1100 further includes a preview viewer 1120 to review the composed multi-angle video and a GUI element 1130 to show thumbnail images selected from videos included in the multi-angle video. The user may view how the multi-angle video would look like based on the selected sequence. If the user is not satisfied with the selected video sequence, the user may modify the selection using the GUI elements 1110 until the desired video is obtained.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for composing a multi-angle video at a client device, the method comprising:
   capturing a video to be used in a multi-angle video by a client device associated with a target user, the multi-angle video comprising at least a portion of the captured video and a plurality of portions of other videos captured by other users nearby the target user;
   determining a plurality of metadata associated with the captured video, the plurality of metadata associated with the captured video comprises at least one from the group consisting of:
      geolocation information describing a location of the client device,
      timestamp indicating when the video was captured by the client device,
      identification of key-frames extracted from the captured video, and
      identification of lower resolution images corresponding to the extracted key-frames; and
   sending the captured video and associated metadata to a computer server.

2. The computer-implemented method of claim 1, further comprising:
   determining geolocation information describing a location of the client device;
   synchronizing a timestamp associated with the capture video with a clock of the computer server;
   extracting a plurality of key-frames of the captured video; and
   generating lower resolution images corresponding to the extracted key-frames.

3. The computer-implemented method of claim 2, wherein extracting a plurality of key-frames from the captured video comprises:
   extracting a video frame from the captured video for every predefined time interval.

4. The computer-implemented method of claim 2, wherein extracting a plurality of key-frames from the captured video further comprises:
   extracting a video frame from the captured video for very predefined set of video frames of the captured video.

5. The computer-implemented method of claim 1, wherein the geolocation comprises at least one from a group comprising: a latitude, a longitude, an altitude, and an orientation associated with the client device.

6. The computer-implemented method of claim 1, further comprising:
   sending a request to compose a multi-angle video including the captured video to the computer server;
   receiving a plurality of portions of other videos captured by other users nearby the target user;
   selecting one or more portions of other videos; and
   generating the multi-angle video based on the selected portions of other videos and the video captured by the client device associated with the target user.

7. The computer-implemented method of claim 6, wherein generating the multi-angle video comprises:
   combining the selected portions of other videos captured by other users nearby the target user with the video captured by the client device associated with the target user according to timestamps associated with the selected videos.

8. A computer-implemented method for composing a multi-angle video, the method comprising:
   receiving, from a target user, a request to compose a multi-angle video;
   receiving a video captured by the target user and a plurality videos captured by other users nearby the target user;
   identifying the plurality of videos captured by the other users nearby the target user;

presenting, to the target user, the plurality of videos captured by the other users nearby the target user;

receiving, from the target user, a selection of portions of videos captured by the target user and the other users nearby the target user, wherein the selection comprises at least a first portion of the video captured by the target user, and a second portion of a video captured by one user nearby the target user; and composing a multi-angle video based on the selected portions of the videos.

9. The computer-implemented method of claim 8, wherein the nearby users are users that were recording a video concurrently with the target user, and wherein the nearby users were located within a threshold distance of a location of the target user when the target user was recording the video.

10. The computer-implemented method of claim 8, further comprising:
   extracting the first portion from the video captured by the target user, and extracting the second portion from the video captured by the one user nearby the target user, and
   combining the first portion and the second portion to generate the multi-angle video.

11. The computer-implemented method of claim 8, wherein identifying the plurality of videos captured by the other users comprises:
   determining a geolocation and a time associated with a video captured by the target user; and
   identifying other users that captured a video that overlapped in time with the video captured by the target user and have a geolocation within a threshold distance of the geolocation associated with the video captured by the target user.

12. The computer-implemented method of claim 8 wherein identifying the plurality of videos captured by the other users comprises:
   determining a geolocation and a time associated with a video captured by the target user; and
   identifying a geographical boundary based on the determined geolocation; and
   identifying other users that captured a video that overlapped in time with the video captured by the target user and have a geolocation within the identified geographical boundary.

13. The computer-implemented method of claim 12, wherein the geographical boundary is a circle centered at the determined geolocation associated with the video captured by the target user.

14. The computer-implemented method of claim 12, wherein identifying the geographical boundary comprises:
   identifying a geographical feature nearby the determined geolocation associated with the video captured by the target user; and
   identifying a geographical boundary associated with the identified geographical feature.

15. The computer-implemented method of claim 8, further comprising:
   responsive to determining that a video from the plurality of videos captured by the other users is unavailable, sending a request to the user associated with the unavailable video to provide the unavailable video.

16. A non-transitory computer readable storage medium storing executable computer program instruction for composing a multi-angle video at a client device, the instruction when executed by a computer processor cause the computer processor to:

multi-angle video by a client device associated with a target user, the multi-angle video comprising at least a portion of the captured video and a plurality of portions of other videos captured by other users nearby the target user;

determining a plurality of metadata associated with the captured video, the plurality of metadata associated with the captured video comprises at least one of the following:
   geolocation information describing a location of the client device,
   timestamp indicating when the video was captured by the client device,
   identification of key-frames extracted from the captured video, and
   identification of lower resolution images corresponding to the extracted key-frames; and send the captured video and associated metadata a the computer server.

17. The computer readable storage medium of claim 16, wherein the instructions when executed by a computer processor further cause the computer processor to:
   determine geolocation information describing a location of the client device;
   synchronize a timestamp associated with the capture video with a clock of the computer server;
   extract a plurality of key-frames of the captured video; and
   generate lower resolution images corresponding to the extracted key-frames.

18. The computer readable storage medium of claim 16, wherein the instructions when executed by a computer processor further cause the computer processor to:
   send a request to compose a multi-angle video including the captured video to the computer server;
   receive a plurality of portions of other videos captured by other users nearby the target user;
   select one or more portions of other videos; and
   generate the multi-angle video based on the selected portions of other videos and the video captured by the client device associated with the target user.

19. A non-transitory computer readable storage medium storing executable computer program instruction for composing a multi-angle video, the instruction when executed by a computer processor cause the computer processor to:
   receive, from a target user, a request to compose a multi-angle video;
   receive a video captured by the target user and a plurality videos captured by other users nearby the target user;
   identify the plurality of videos captured by the other users nearby the target user;
   present, to the target user, the plurality of videos captured by the other users nearby the target user;
   receive, from the target user, a selection of portions of videos captured by the target user and the other users nearby the target user, wherein the selection comprises at least a first portion of the video captured by the target user, and a second portion of a video captured by one user nearby the target user; and
   compose a multi-angle video based on the selected portions of the videos.

20. The computer readable storage medium of claim 19, wherein the other users are users that were recording a video concurrently with the target user, and wherein the other users were located within a threshold distance of a location of the target user when the target user was recording the video.

21. The computer readable storage medium of claim 19 wherein the instructions for identifying the plurality of videos captured by the other users, when executed by the computer processor cause the processor to:
    determine a geolocation and a time associated with a video captured by the target user; and
    identify a geographical boundary based on the determined geolocation; and
    identify other users that captured a video that overlapped in time with the video captured by the target user and have a geolocation within the identified geographical boundary.

22. The computer readable storage medium of claim 19, wherein the instructions when executed by a computer processor further cause the computer processor to:
    responsive to determining that a video from the plurality of videos captured by the other users is unavailable, send a request to the user associated with the unavailable video to provide the unavailable video.

\* \* \* \* \*

UNITED STATES PATENT AND TRADEMARK OFFICE
CERTIFICATE OF CORRECTION

PATENT NO. : 9,554,160 B2
APPLICATION NO. : 14/714670
DATED : January 24, 2017
INVENTOR(S) : Zheng Han and Jie Xu It is certified that error appears in the above-identified patent and that said Letters Patent is hereby corrected as shown below:

- At Column 14, Line 22, Claim 2 delete "capture video" and replace with "captured video"
- At Column 14, Line 36, Claim 4 delete "very predefined" and replace with "every predefined"
- At Column 16, Line 1, Claim 16 delete "to: multi-angle video" and replace with "to: receive a request to compose multi-angle video"
- At Column 16, Line 6, Claim 16 delete "determining a plurality" and replace with "determine a plurality"
- At Column 16, Line 26, Claim 17 delete "capture video" and replace with "captured video"
- At Column 16, Line 49, Claim 19 delete "plurality videos" and replace with "plurality of videos"

Signed and Sealed this
Fourteenth Day of November, 2017

Joseph Matal
*Performing the Functions and Duties of the
Under Secretary of Commerce for Intellectual Property and
Director of the United States Patent and Trademark Office*